Patented Dec. 8, 1942

2,304,274

UNITED STATES PATENT OFFICE 2,304,274

TREATING SEWAGE

Aage Ferslev Nielsen, Red Bank, N. J., assignor to Guggenheim Brothers, New York, N. Y., a co-partnership No Drawing. Application April 3, 1940, Serial No. 327,631. In the Union of South Africa August 29, 1939

4 Claims. (Cl. 210—2)

This invention relates to sewage treatment and has for an object the provision of an improved process for treating sewage and similar waste liquors. More particularly, the invention contemplates the provision of an improved process for removing putrescible matter from sewage and similar waste liquors involving the use of sewage sludge produced during the course of the process for aiding in coagulating, oxidizing or otherwise removing the putrescible matter.

Sewage sludge is employed customarily in conjunction with aeration for aiding in sewage purification. Processes employing sewage sludge include, for example, the activated sludge process and biochemical processes of the type of that described in the United States patent to Bevan No. 2,021,679. In such processes, the sewage sludge is added to the sewage at or near the commencement of the aeration treatment. The added sewage sludge aids in purification and clarification through the action of bacteria contained therein and through the coagulating action of flocculated matter contained therein. Bacterial activity is promoted by aeration, and clarification is promoted by the presence in the sewage of relatively large quantities of sewage solids introduced with the added sludge.

I have found that bacterial action is promoted when the added sewage sludge is employed in limited quantities, the absolute quantities depending primarily upon the character and temperature of the sewage undergoing treatment. When larger quantities are employed, bacterial action is sluggish and the efficiency of the process is relatively low. The limited quantities of returned sewage sludge which promote the production of optimum results with respect to bacterial activity usually are too small to promote the production of optimum results with respect to clarification through the coagulating action of the flocculated matter of the sludge.

The present invention is based upon my discovery that the desirable effects of the bacterial action and the coagulating action of added sewage sludge may be obtained more advantageously by adding the sewage sludge to sewage subjected to aeration in successive increments each of which is not substantially greater in amount than that which promotes the production of optimum bacterial activity and the total of which increments is sufficient in amount to produce desirable clarification through the coagulating action of flocculated matter contained therein.

The process of the invention may be considered as a multiple stage aeration process in each stage of which there is added an amount of sewage sludge not substantially greater than that which will promote optimum bacterial activity under the conditions of aeration employed and in which there is added in two or more increments sufficient sewage sludge to promote desirable settling of the sludge and clarification of the accompanying liquor. Each stage of aeration may be considered, in effect, and in the results produced, a separate sewage treatment process, with the partially purified sewage from each preceding stage after the first stage serving, in effect, as raw sewage for treatment in each succeeding stage. Similar degrees of purification may be accomplished in each stage, thus providing in a single process the additive or cumulative effects, with respect to purification, of several processes.

Any suitable type of apparatus may be employed in carrying out a process in accordance with the invention. The various aeration stages may be carried out in a single aeration vessel, or a plurality of aeration vessels may be employed with one or more aeration stages being carried out in each.

In carrying out a biochemical process of the type of that described in the aforementioned Patent No. 2,021,679 in which a chemical coagulating agent is employed in conjunction with the returned sludge, the chemical coagulating agent may be present in one or more aeration stages. The chemical coagulating agent may be added at or near the commencement or at or near the completion of the complete aeration treatment or any stage of the aeration treatment or at any other suitable time preceding, during or following the complete aeration treatment or any stage of the aeration treatment. Any suitable water-soluble or water-insoluble chemical coagulating agent may be employed in carrying out a biochemical process in accordance with the invention. I prefer to employ a water-soluble compound of a trivalent metal such as iron or aluminum such, for example, as ferric sulphate, ferric chloride, chlorinated copperas, ferrous sulphate and aluminum sulphate or a mixture of two or more of such compounds.

The invention permits the use of large amounts of solids to effect desirable settling and clarification without causing interference with aeration, oxidation and bacterial action. Because of the addition of the returned sewage sludge at spaced intervals uniform instead of tapered or graduated aeration may be employed. The invention facilitates the maintenance of proper sludge levels in clarifiers to which treated sewage from aeration vessels is delivered. It also reduces bulking tendencies which normally result from unavoidable changes in sewage loads and volumes.

The invention provides a flexible process for handling variable loads and volumes of sewage. Apparatus may be so designed that for light loads and low volumes the first stage or stages may be employed merely for primary aeration and for heavy loads and high volumes may be employed similarly to the subsequent stage or stages. Any desired or necessary stages of aeration may be employed, and the conditions established in each stage may be varied as desired or required to accomplish suitable results.

I claim:

1. In a sewage treatment process involving aeration of sewage in the presence of biochemical sewage sludge while flowing through suitable aeration apparatus and removal of the treated sewage from the aeration apparatus, the improvement which comprises adding the biochemical sewage sludge to the sewage undergoing treatment by aeration at a plurality of points in the path of flow of the sewage.

2. In a sewage treatment process involving aeration of sewage in the presence of a chemical coagulating agent and added sewage sludge produced in the course of the process while flowing through suitable aeration apparatus and removal of the treated sewage from the aeration apparatus, the improvement which comprises adding the sewage sludge to the sewage undergoing treatment by aeration at a plurality of points in the path of flow of the sewage.

3. The process of treating sewage which comprises subjecting the sewage to successive aeration treatments in the presence of a chemical coagulating agent and successively added quantities of sewage sludge produced in the course of the process and thereby coagulating putrescible matter contained in the sewage in the form of settleable sludge, separating the resulting settleable sludge from the accompanying liquor, and utilizing the separated sludge as the source of said added sludge for incorporation in sewage undergoing the aforesaid aeration treatments, the quantity of sludge added to the sewage for each successive aeration treatment being not substantially greater than that which will produce optimum results with respect to bacterial action of the added sludge and the total quantity of sludge added in the course of the process being not substantially greater than that which will produce optimum results with respect to settling of the sludge produced and clarification of the treated sewage.

4. The process of treating sewage which comprises subjecting the sewage to successive aeration treatments in the presence of successively added quantities of chemical coagulating agent and sewage sludge produced in the course of the process and thereby coagulating putrescible matter contained in the sewage in the form of settleable sludge, separating the resulting settleable sludge from the accompanying liquor, and utilizing the separated sludge as the source of said added sludge for incorporation in sewage undergoing the aforesaid aeration treatments, the quantity of sludge added to the sewage for each successive aeration treatment being not substantially greater than that which will produce optimum results with respect to bacterial action of the added sludge and the total quantity of sludge added in the course of the process being not substantially greater than that which will produce optimum results with results to settling of the sludge produced and clarification of the treated sewage.

AAGE FERSLEV NIELSEN.